LATCHING RETRACTILE CORD REEL

Filed March 11, 1966 2 Sheets-Sheet 1

INVENTOR
H. A. HILSINGER JR.
BY [signature]
ATTORNEY

April 16, 1968 H. A. HILSINGER, JR 3,378,214

LATCHING RETRACTILE CORD REEL

Filed March 11, 1966 2 Sheets-Sheet 2

United States Patent Office 3,378,214

Patented Apr. 16, 1968

3,378,214

LATCHING RETRACTILE CORD REEL

Harry A. Hilsinger, Jr., Hope Township, Warren County, N.J., assignor to Bell Telephone Laboratories, Incorporated, New York, N.Y., a corporation of New York Filed Mar. 11, 1966, Ser. No. 533,533
8 Claims. (Cl. 242—107.7)

ABSTRACT OF THE DISCLOSURE

In a spring loaded retractile cord arrangement for an electrical appliance or telephone handset, a magnetically actuated catch mechanism is employed to arrest the cord at any preselected position without requiring the user to work against spring tension while holding the cord in that preselected position.

Figure 1:
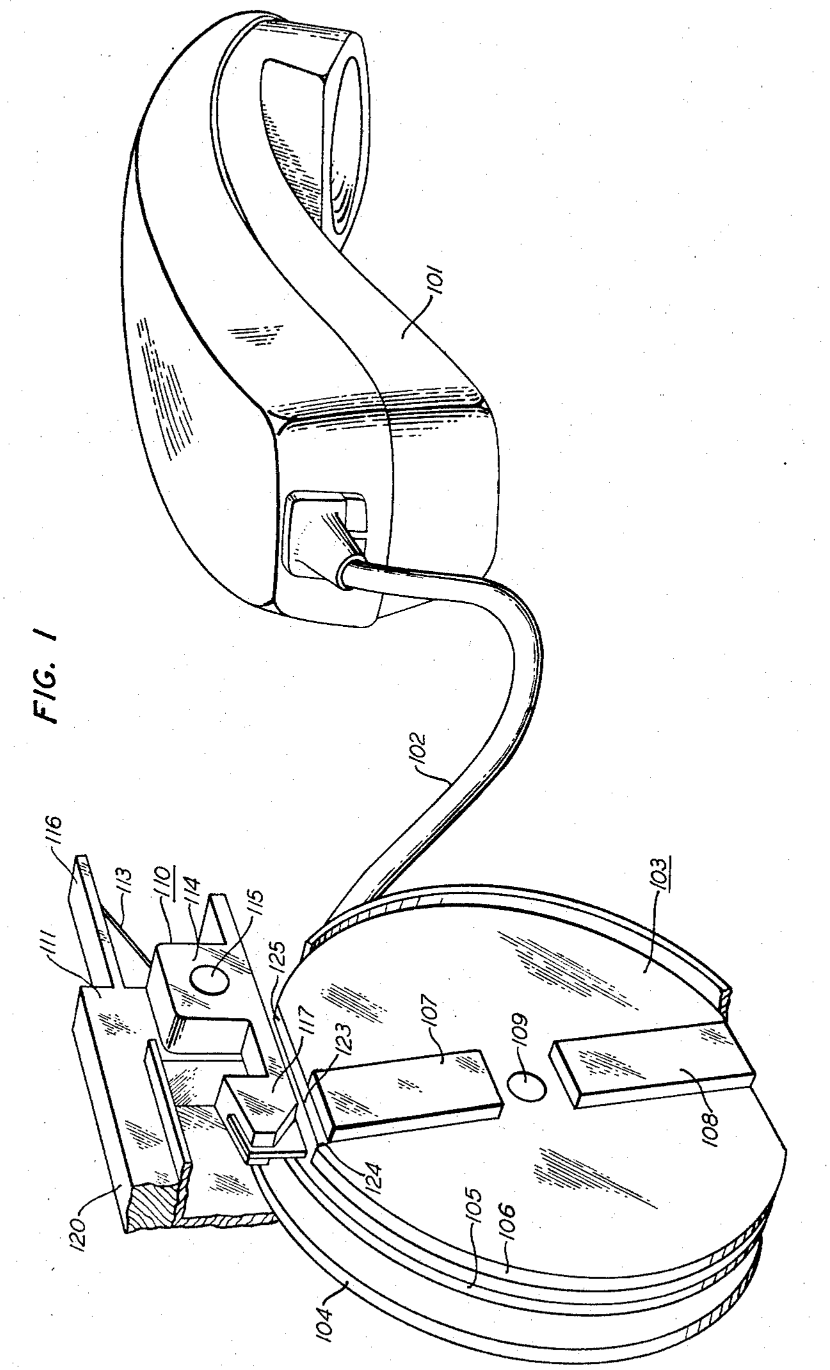

This invention relates to spring loaded reels for automatically retracting and storing lines or cords and particularly to automatic catches for such devices that serve to hold the cord at any particular position of travel at the option of the user without placing tension on the cord.

Spring loaded reels are in common usage in a wide variety of applications from window shade rollers to retractile telephone cords for example. In the telephone art in particular, the use of such arrangements is increasing at a rapid rate owing to the increase in flush or panel phones or similar custom phones where out-of-sight storage of telephone handset cords is highly desirable from the standpoint of both appearance and convenience.

Despite the increasing use of cord retracting reels for telephone handsets, a persistent problem remains to be solved before such devices can attain their full potential utility. Cord retracting reels typically exert a certain amount of tension on the cord as the cord unwinds from the reel hub in response to the force exerted on the cord as the user pulls on the handset. The retracting force exerted by the reel, although not great, remains constant while the user holds the handset, thus requiring the user to exert a continuous balancing force to maintain the cord in position. The requirement that the user constantly oppose the force of the reel with a balancing force is a source of annoyance and tends to cancel out the otherwise desirable aspects of such retractile cords.

One means of overcoming the disadvantage noted is to employ a catch device, which may be of the type commonly found on window shade rollers for example, that effectively snubs the cord when it is brought gently to rest and releases from its snubbing state whenever the cord is pulled out abruptly and abruptly released. Known catch devices of the type described do not readily lend themselves to adaptation for telephone cord use, however, in that reliability is typically far below the standards required for telephone equipment. High reliability can be attained with ratchet type catches but these have an undesirably high operating noise. Certain gravity operated catches have suitable reliability and low noise levels but have a limited versatility of application in that a particular mounting configuration or physical attitude is required owing to the reliance on gravity for operation. Additionally, a number of known catches lack the simplicity that is essential for low cost production.

Accordingly, one object of the invention is to enhance the reliability of cord reel catch devices.

Another object is to reduce both the cost and complexity of cord reel catches.

An additional object is to eliminate the need for a particular physical reel attitude for the proper operation of a cord arresting catch.

These and other objects are achieved in accordance with the principles of the invention by uniquely turning a magnetic force to account in a fashion that results in complete reliability irrespective of the particular position in which the reel is mounted. In one illustrative embodiment, a reel comprising a pair of cord retaining flanges and an integral connecting hub is affixed to a stationary mounting or reel casing. One or more magnets are mounted in radial fashion near the periphery of one of the reel flanges and a spring-loaded, pivotally mounted, magnetically attractable catch is affixed to the reel casing. When one of the reel magnets moves past the catch as the reel rotates, magnetic force is exerted on the catch to bring it into arresting engagement with the reel. Engagement occurs, however, only if the reel is rotating in the wind-up or reel-in direction and further, only if the speed of the reel magnet past the catch is sufficiently slow to permit the magnetic force to overcome the spring bias and the inertia of the catch that normally maintains the catch in the nonoperated or unengaged position. In accordance with the invention, a means is provided to permit a simple spring adjustment that, in effect, regulates the magnitude of the maximum speed of reel wind-up that can be allowed and still enable the magnetically operated catch.

Accordingly, one feature of the invention relates to reel mounted magnets utilized to operate a magnetically responsive catch to arrestingly engage the reel and thus temporarily disable the automatic wind-up feature.

Another feature is a pivotally mounted catch device for temporarily disabling the automatic wind-up mechanism of a cord reel—the catch being rendered operative whenever the attracting force of a reel mounted magnet overcomes the bias of a spring that normally maintains the catch in a nonarresting or unengaged condition.

Figure 2:
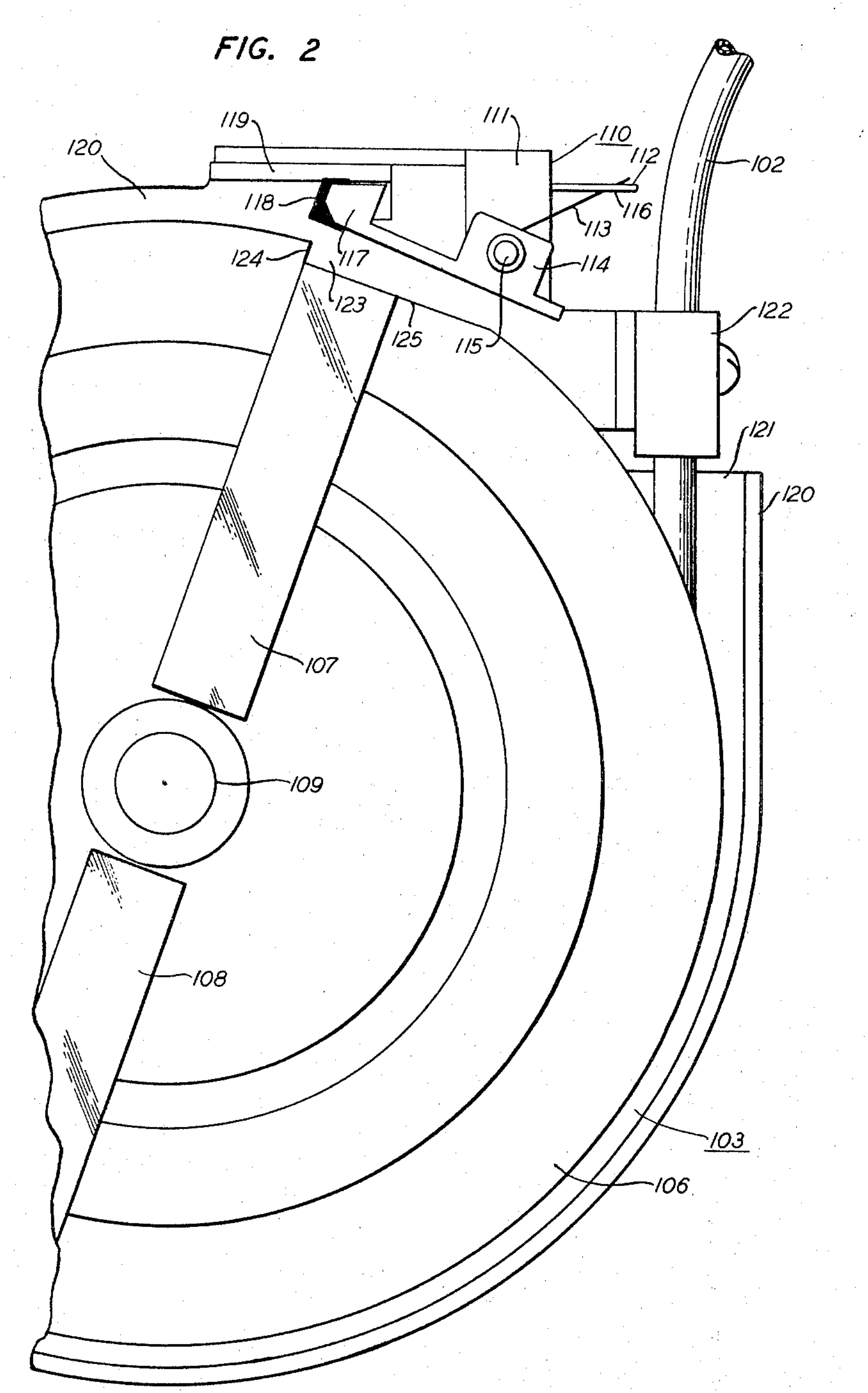

The principles of the invention as well as additional objects and features thereof will be fully apprehended from the following detailed description of an illustrative embodiment and from the drawing in which:

FIG. 1 is a sketch of a magnetically operated cord reel catch device in accordance with the invention shown in perspective; and FIG. 2 is a plan view, to an enlarged scale, of a portion of the mechanism shown in FIG. 1.

In FIG. 1 a conventional telephone handset 101 is shown with its cord 102 mounted for retraction by a spring-loaded, cord retracting reel 103. The reel 103 includes a pair of main flange members 104 and 105 with a space therebetween to accommodate the cord 102. The general construction of the reel 103 which is mounted for rotation about a hub member 109, may be substantially identical to any one of a number of conventional cord retracting reels having internally mounted, conducting spring members, that terminate the individual conductors of cord 102 and accordingly form a part of the electrical circuit. Such reels are typically arranged to ensure a steady retracting force on the cord irrespective of the amount of the cord accommodated by the reel and irrespective of the particular rotational position of the reel. A reel of this general form is shown in Patent 1,247,358 issued to J. Zwilling Nov. 20, 1917.

As shown in FIG. 2, the reel assembly 103 also includes an outer casing member 120, a portion of which is shown forming an accommodating reel entrance slot 121 for the cord 102. The cord is further positioned by a guide bracket 122 which in turn is an extension of the outer casing 120. Mounted on casing 120 is a catch assembly 110 that includes a fixed mounting member 111 and a rotatable member or catch proper 114 mounted for rotational movement about a hub 115. The catch 114 is shown in FIG. 2 in its normal or disengaged position wherein a spring 113, affixed to the catch 114 and to a cantilever securing member 112, retains the catch 114 in position so that the end portion 117 rests against a lip portion 119 of the fixed mounting member 111.

In accordance with the invention, an auxiliary flange 106, affixed to reel flange 105, is also mounted for rotational movement about the hub 109. Two diametrically opposed bar magnets 107 and 108 are mounted on the auxiliary flange 106. As force is exerted on the handset 101 to unreel the cord 102 as the reel 103 rotates, alternate ones of the magnets 107 and 108 move in close proximity to the catch 114. If the reel 103 is rotated with sufficient speed, insufficient time is permitted for the attractive force of magnets 107 and 108 to overcome the catch inertia and the restraining force of spring 113 and, accordingly, the catch 114 remains in the unoperated position illustrated in FIG. 2. Similarly, if the cord 102 is released abruptly with the reel 103 in a position wheren neither of the magnets 107 or 108 s in close proximity to the end of the catch 117, the speed of rewind is sufficiently great to prevent the catch 114 from swinging downwardly. If, however, tension on cord 102 is slacked off relatively gradually or if the reel is unwound relatively slowly, sufficient time is made available for one of the magnets 107 or 108 to overcome catch inertia and the restraining force of the spring 113 and the catch 114 rotates in a counterclockwise direction toward engagement with the auxiliary flange 106, as shown in FIG. 1.

The flange 106 includes a recessed area 123 bounded by a flat portion 125 and a vertical stop portion or shoulder 124 at the exposed end of magnet 107. A similar recessed portion or notch, not shown in detail, is present at the exposed end of magnet 108. It is evident, therefore, in view of the foregoing description, that a slow release of the tension on cord 102 will permit catch 114 to become engaged with the flange stop 124 thus locking the reel 103 temporarily in position. When latching occurs in the manner indicated, reel 103 no longer applies tension to cord 102 and, accordingly, no balancing force need be exerted by the user in holding handset 101.

In accordance with the invention, a shock absorbing, noise suppressing material 118, such as rubber, for example, is secured to the end portion 117 of catch 114. Smoothness of operation and substantially noise-free engagement and disengagment of the catch 114 is thereby ensured.

To release the catch 114 from its engaged condition simply requires that the user unreel a sufficient amount of the cord 102 so that magnet 107 rotates clear of the catch 114 and the catch 114 is returned to its unengaged condition, as shown in FIG. 2, under the force of the spring 113. If at that point restoring force on the cord 102 is suddenly released, the reel 103 is permitted to rotate in a clockwise direction beneath the catch 114 with sufficient speed to prevent either of the magnets 107 or 108 from overcoming catch inertia and the restraining force of the spring 113.

It is evident that the tension on spring 113 is a key factor in determining the speed at which catch 114 will operate. In accordance with the invention, this speed may readily be adjusted by bending the cantilever member 112 slightly either upwardly or downwardly to increase or decrease spring tension. Although two catch operating magnets are shown in the embodiment of the invention disclosed herein, either a single magnet or several magnets similarly disposed may be employed, the particular number selected being determined primarily by reel size, cost and the degree of rewind desired before the catch operates when the cord is released at a random reel position.

It is to be understood that the embodiment described herein is merely illustrative of the principles of the invention. Various modfications may be made thereto by persons skilled in the art without departing from the spirit and scope of the invention.

What is claimed is:

1. Apparatus for retracting and storing a line, comprising, in combination, a spring-loaded reel including a pair of line retaining flange members and a hub, the periphery of one of said members including a notch having a shoulder portion, one end of said line being anchored to said hub, magnetically operative means responsive to the application to said line of a holding force substantially equal to but less than the retracting force exerted on said line by said reel for temporarily effecting engagement with said shoulder portion thereby locking said line and said reel in a fixed position, said means being releasably responsive to a relatively quick pull on said line in opposition to said retracting force followed by the surrender of said line to said retracting force whereby said reel and said line may readily be released from said fixed position.

2. Apparatus in accordance with claim 1 wherein said means includes a pivotally mounted magnetically attractable catch member and at least one magnet mounted for rotation with said reel past said catch member.

3. Apparatus in accordance with claim 1 wherein said means includes at least one magnet mounted for rotation with said reel, a pivotally mounted magnetically attractable catch member positioned to permit attraction by said magnet and to permit arresting engagement with said reel at a particular rotational position of said reel established by the relative position of said magnet and said catch.

4. Apparatus for retracting and storing a line comprising, in combination, a spring-loaded reel including a pair of flange members and a central hub member, one of said flange members including at least one notched portion, a catch member mounted for reel-arresting engagement with said notched portion, a spring normally biasing said catch member in a position preventing said arresting engagement, a magnet mounted on said reel capable of exerting a magnetic force on said catch member overcoming the biasing force of said spring to permit said arresting engagement, said arresting engagement being dependent upon the distance between said magnet and said catch, and upon the direction and speed of rotation of said reel.

5. Apparatus in accordance with claim 4 including a fixed frame member for mounting said reel, said catch member being pivotally mounted on said frame and means for adjusting the tension on said spring thereby to adjust the speed differential required between said reel and said catch member that permits arresting engagement of said catch member with said reel.

6. Apparatus for retracting a telephone handset cord comprising, in combination, a spring-loaded reel, one portion of said cord relatively remote from said handset being affixed to said reel, said reel exerting a continuous force on said cord tending to wind said cord on said reel, a greater force on said handset being effective to unwind said cord from said reel, said reel including a notched portion on one rim thereof and at least one magnet mounted thereon, magnetically responsive catch means for preventing said reel from winding up said cord, said catch means being attractable to said magnet and engageable with said notch portion, said catch means being operatively enabled to prevent said reel from winding up said cord only when said reel is operating in the wind-up direction at a rate of rotation not exceeding a preselected rate.

7. Apparatus in accordance with claim 6 including means for adjusting the magnitude of said preselected rate.

8. Apparatus in accordance with claim 7 wherein said adjusting means includes a spring member normally biasing said catch means out of engagement with said reel.

References Cited

UNITED STATES PATENTS

| | | | |
|---|---|---|---|
| 2,341,440 | 2/1944 | Hammer | 160—298 |
| 2,451,163 | 10/1948 | Goin | 242—107.7 |
| 2,515,708 | 7/1950 | Hammer | 160—298 |
| 3,176,931 | 4/1965 | Hannay | 242—107.7 |

WILLIAM S. BURDEN, *Primary Examiner.*